US012776491B2

(12) United States Patent
Takagi et al.

(10) Patent No.: US 12,776,491 B2
(45) Date of Patent: Oct. 27, 2026

(54) LITHIUM-ION SECONDARY BATTERY INCLUDING AN ANODE BODY LAYER CONTAINING GRAPHITE PARTICLES HAVING A CRYSTALLITE SIZE OF A (004) PLANE TO A CRYSTALLITE SIZE OF A (110) PLANE OF 0.683 OR MORE

(71) Applicants: TOYOTA JIDOSHA KABUSHIKI KAISHA, Toyota (JP); Panasonic Holdings Corporation, Kadoma (JP)

(72) Inventors: Shigeharu Takagi, Toyota (JP); Mitsuhiro Murata, Kawanishi (JP)

(73) Assignees: TOYOTA JIDOSHA KABUSHIKI KAISHA, Toyota (JP); Panasonic Holdings Corporation, Kadoma (JP)

( * ) Notice: Subject to any disclaimer, the term of this patent is extended or adjusted under 35 U.S.C. 154(b) by 516 days.

(21) Appl. No.: 18/203,416

(22) Filed: May 30, 2023

(65) Prior Publication Data

US 2023/0387412 A1 Nov. 30, 2023

(30) Foreign Application Priority Data

May 31, 2022 (JP) ................................ 2022-088996

(51) Int. Cl.

| | |
|---|---|
| ***H01M 4/587*** | (2010.01) |
| ***H01M 4/133*** | (2010.01) |
| ***H01M 10/0525*** | (2010.01) |
| *H01M 4/02* | (2006.01) |

(52) U.S. Cl.
CPC ........... *H01M 4/587* (2013.01); *H01M 4/133* (2013.01); *H01M 10/0525* (2013.01); *H01M 2004/027* (2013.01)

(58) Field of Classification Search
CPC ... H01M 4/587; H01M 4/133; H01M 10/0525
See application file for complete search history.

(56) References Cited

U.S. PATENT DOCUMENTS

| | | | | |
|---|---|---|---|---|
| 2013/0130127 | A1* | 5/2013 | Sotowa .................. | H01G 11/38 423/448 |
| 2015/0207177 | A1 | 7/2015 | Ose et al. | |
| 2017/0040636 | A1 | 2/2017 | Oki et al. | |
| 2023/0100932 | A1 | 3/2023 | He et al. | |

FOREIGN PATENT DOCUMENTS

| | | | | |
|---|---|---|---|---|
| CN | 103053054 | A | 4/2013 | |
| CN | 106450439 | A | 2/2017 | |
| CN | 107437616 | A * | 12/2017 | ............ H01M 4/505 |
| DE | 102016113927 | A1 * | 2/2017 | ........ H01M 10/0562 |
| JP | 2000-133267 | A | 5/2000 | |

(Continued)

*Primary Examiner* — Jimmy Vo

(74) *Attorney, Agent, or Firm* — Sughrue Mion, PLLC

(57) ABSTRACT

A lithium-ion secondary battery of the present disclosure includes a cathode body layer, a separator layer, and an anode body layer in that order, wherein the anode body layer contains a solid electrolyte and an anode active material, and wherein the anode active material is graphite particles having a ratio of a crystallite size of a (004) plane to a crystallite size of a (110) plane (the crystallite size of the (004) plane/the crystallite size of the (110) plane) measured by X-ray crystal diffraction measurement using CuKα rays of 0.683 or more.

9 Claims, 6 Drawing Sheets

(56) References Cited

FOREIGN PATENT DOCUMENTS

| | | | |
|---|---|---|---|
| JP | 2001-316105 | A | 11/2001 |
| JP | 2007-179955 | A | 7/2007 |
| JP | 2009-283344 | A | 12/2009 |
| JP | 2019-083163 | A | 5/2019 |
| JP | 2022-539930 | A | 9/2022 |
| WO | 2014/016907 | A1 | 1/2014 |
| WO | 2021/243648 | A1 | 12/2021 |

* cited by examiner

LITHIUM-ION SECONDARY BATTERY INCLUDING AN ANODE BODY LAYER CONTAINING GRAPHITE PARTICLES HAVING A CRYSTALLITE SIZE OF A (004) PLANE TO A CRYSTALLITE SIZE OF A (110) PLANE OF 0.683 OR MORE

CROSS-REFERENCE TO RELATED APPLICATION

This application claims priority to Japanese Patent Application No. 2022-088996 filed on May 31, 2022, incorporated herein by reference in its entirety.

BACKGROUND

1. Technical Field

The present disclosure relates to a lithium-ion secondary battery.

2. Description of Related Art

Japanese Unexamined Patent Application Publication No. 2001-316105 (JP 2001-316105 A) discloses a method of producing graphite powder including a process of carbonizing bulk mesophase carbon, a process of graphitizing the obtained carbonized material, and a grinding process, wherein the bulk mesophase carbon has an anisotropic domain diameter of 1,300 Å or more measured by a small angle X-ray scattering technique, and the grinding process includes performing at least one of high-speed grinding and shear grinding before the graphitization process.

Japanese Unexamined Patent Application Publication No. 2019-83163 (JP 2019-83163 A) discloses a carbon evaluation method including a process of measuring X-ray diffraction patterns of a group of carbon samples, a process of measuring a crystallite size distribution of the (102) plane or the (104) plane, which is a plane for evaluating the group of carbon samples in an a-axis direction and a c-axis direction, from the X-ray diffraction patterns of the group of carbon samples using a Fundamental Parameter method (FP method) and measuring a peak top or a distribution width of the crystallite size distribution, a process of performing low temperature performance evaluation and/or high-rate charging and discharging performance evaluation on a group of batteries prepared using respective carbon samples having different peak tops or distribution widths in crystallite size distributions among the group of carbon samples as electrode materials of respective batteries and deriving data showing a correlation between the obtained low-temperature performance evaluation result and/or high-rate charging and discharging performance evaluation result and the peak tops or distribution widths in the crystallite size distributions of the group of carbon samples, and a process of measuring a peak top or distribution width in a crystallite size distribution of evaluation carbon corresponding to the peak top or distribution width in the crystallite size distribution of the group of carbon samples based on the data showing the correlation, and evaluating a battery low temperature performance and/or a high-rate battery charging and discharging performance of the evaluation carbon from the peak top or distribution width in the crystallite size distribution of the evaluation carbon.

SUMMARY

In lithium-ion secondary batteries, particularly, all-solid-state lithium-ion secondary batteries, there is a demand for improving the charging and discharging performance particularly high-rate charging and discharging.

The present disclosure provides a lithium-ion secondary battery with the improved charging and discharging performance.

The present inventors found that the above object can be achieved by the following aspects.

Aspect 1

A lithium-ion secondary battery including a cathode body layer, a separator layer, and an anode body layer in that order,

- wherein the anode body layer contains a solid electrolyte and an anode active material, and
- wherein the anode active material is graphite particles having a ratio of a crystallite size of a (004) plane to a crystallite size of a (110) plane (the crystallite size of the (004) plane/the crystallite size of the (110) plane) measured by X-ray crystal diffraction measurement using CuKα rays of 0.683 or more.

Aspect 2

The lithium-ion secondary battery according to Aspect 1, wherein the graphite particles are spherical particles or scaly particles.

Aspect 3

The lithium-ion secondary battery according to Aspect 1 or 2, wherein the graphite particles have a crystallite size of 40 Å or less of a (104) plane measured by X-ray crystal diffraction measurement using CuKα rays.

Aspect 4

The lithium-ion secondary battery according to any one of Aspects 1 to 3, wherein the graphite particles have a ratio of an integrated intensity of the (004) plane to an integrated intensity of the (110) plane measured by X-ray crystal diffraction measurement using CuKα rays of 4.0 or more.

Aspect 5

The lithium-ion secondary battery according to any one of Aspects 1 to 4,

- wherein the anode body layer has a structure in which an anode active material layer and an anode current collector layer are laminated with each other in order from the side of the separator layer, and
- wherein the anode active material and the solid electrolyte are incorporated into the anode active material layer.

Aspect 6

The lithium-ion secondary battery according to any one of Aspects 1 to 5, wherein the cathode body layer has a structure in which a cathode active material layer and a cathode current collector layer are laminated with each other in order from the side of the separator layer.

Aspect 7

The lithium-ion secondary battery according to any one of Aspects 1 to 6, wherein the separator layer is a solid electrolyte layer.

Aspect 8

The lithium-ion secondary battery according to any one of Aspects 1 to 7, wherein the solid electrolyte is a sulfide solid electrolyte.

According to the present disclosure, it is possible to provide a lithium-ion secondary battery with the improved charging and discharging performance in high-rate charging and discharging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below in detail. Here, the present disclosure is not limited to the following embodiments, and various modifications can be made within the scope of the gist of the disclosure.

A lithium-ion secondary battery of the present disclosure includes a cathode body layer, a separator layer, and an anode body layer in that order, and in the lithium-ion secondary battery, the anode body layer contains a solid electrolyte and an anode active material, and the anode active material is graphite particles having a ratio of the crystallite size of the (004) plane to the crystallite size of the (110) plane (crystallite size of the (004) plane/crystallite size of the (110) plane) measured by X-ray crystal diffraction measurement using CuKα rays of 0.683 or more.

Figure 1:
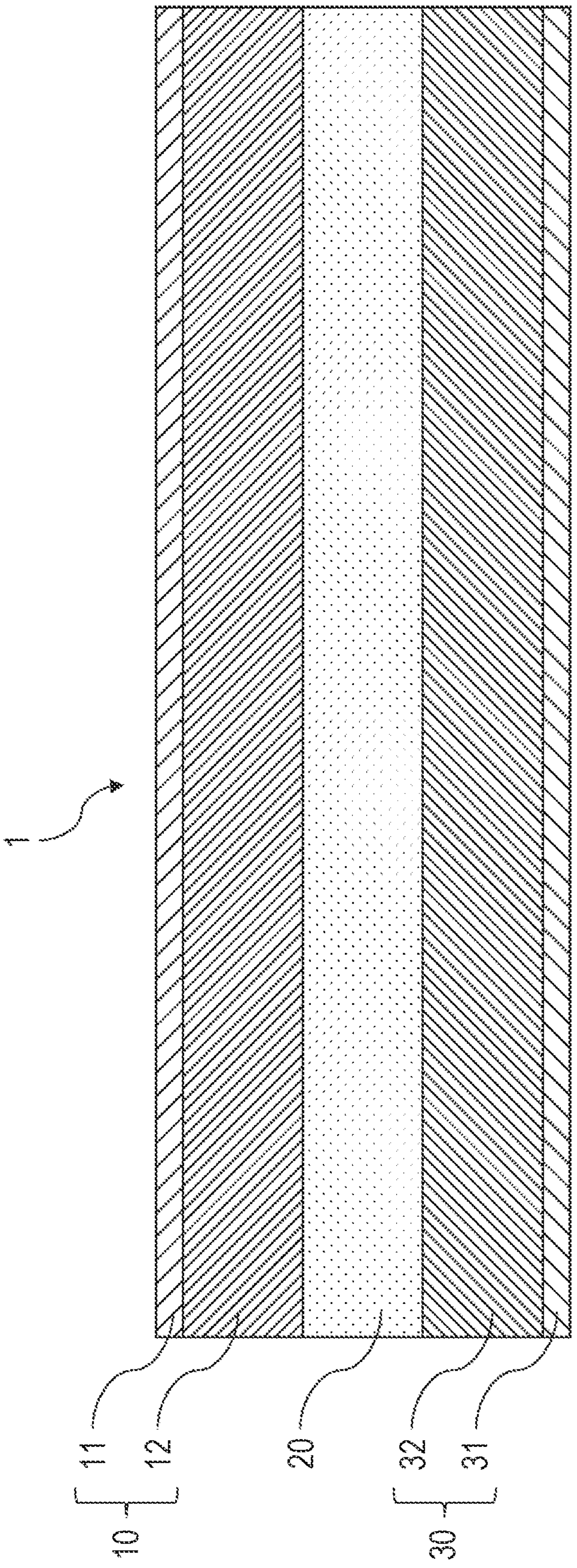
FIG. 1 is a schematic view showing an all-solid-state lithium-ion secondary battery 1 according to a first embodiment of the present disclosure.

FIG. 1 is a schematic view showing an all-solid-state lithium-ion secondary battery 1 according to a first embodiment of the present disclosure.

As shown in FIG. 1, the all-solid-state lithium-ion secondary battery 1 according to the first embodiment of the present disclosure includes a cathode body layer 10, a solid electrolyte layer 20 as a separator layer and an anode body layer 30 in that order. Here, the cathode body layer 10 has a structure in which a cathode active material layer 12 and a cathode current collector layer 11 are laminated with each other in order from the side of the solid electrolyte layer 20. In addition, the anode body layer 30 has a structure in which an anode active material layer 32 and an anode current collector layer 31 are laminated with each other in order from the side of the solid electrolyte layer 20. The anode active material and the solid electrolyte are incorporated into the anode active material layer 32.

In general, in lithium-ion secondary batteries, particularly all-solid-state lithium-ion secondary batteries, there is demand for improving the high-rate charging and discharging performance and particularly the rapid charging performance.

The high-rate charging and discharging performance of all-solid-state lithium-ion secondary batteries are supposed to be influenced significantly by the configuration of the anode body layer. One of the reasons is that a solid electrolyte interphase (SEI) layer with higher resistance is formed by reductive decomposition of a solid electrolyte in all-solid-state lithium-ion secondary batteries than in liquid lithium-ion secondary batteries. The other reason is that a solid electrolyte cannot completely penetrate all grain boundaries, unlike a liquid electrolyte, which causes to degrade lithium-ion diffusivity in an anode body layer.

Regarding this, it is thought that, when diffusibility of lithium on the surface and inside the anode active material is improved, it is possible to improve the charging and discharging performance at a high-rate.

The lithium-ion secondary battery of the present disclosure contains, as the anode active material, graphite particles having a ratio of the crystallite size of the (004) plane to the crystallite size of the (110) plane (crystallite size of the (004) plane/crystallite size of the (110) plane) measured by X-ray crystal diffraction measurement using CuKα rays of 0.683 or more.

Figure 2:
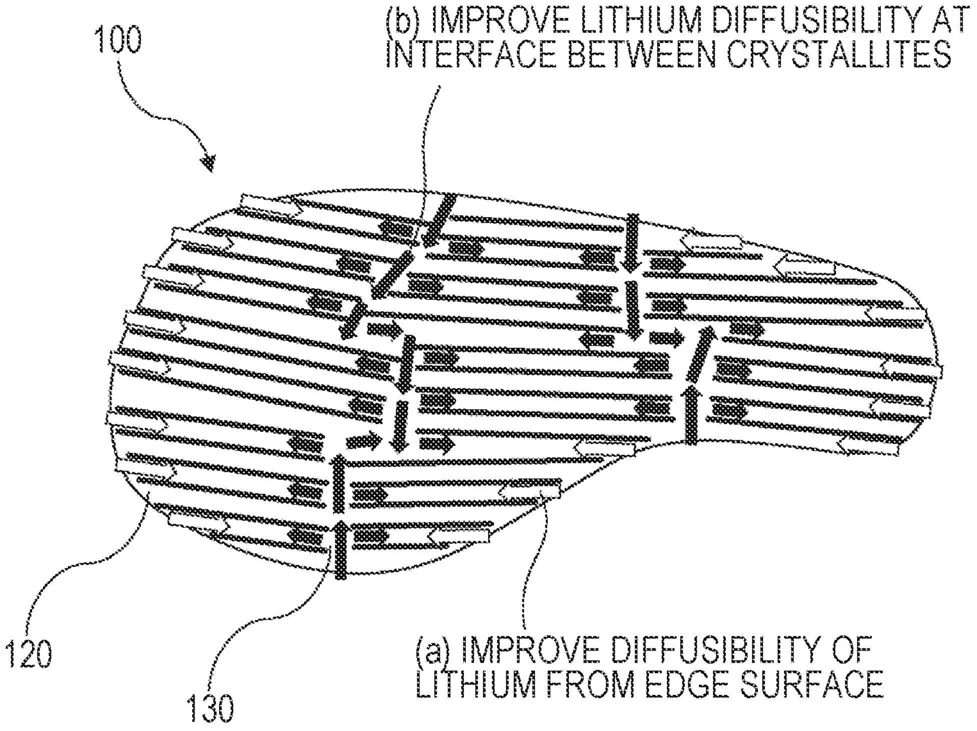
FIG. 2 is a schematic view of a graphite particle 100 contained in the all-solid-state lithium-ion secondary battery 1 according to the first embodiment of the present disclosure.
Figure 3:
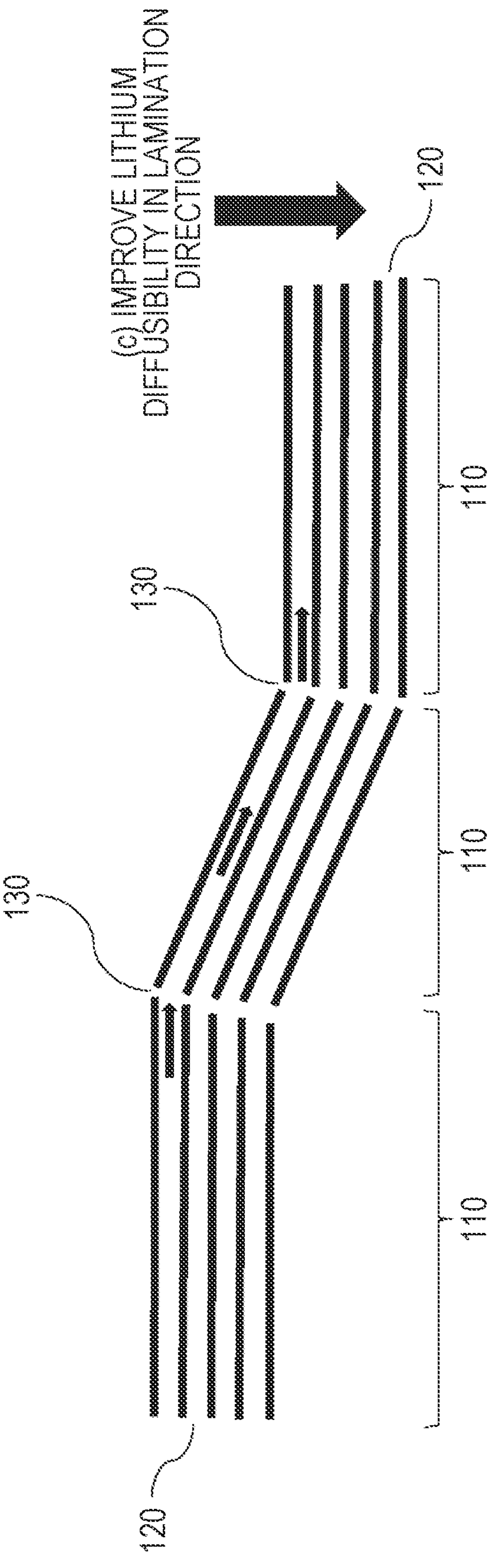
FIG. 3 is a schematic view of a part of the graphite particle 100 contained in the all-solid-state lithium-ion secondary battery 1 according to the first embodiment of the present disclosure.

Such graphite particles are isotropic particles, and as shown in FIGS. 2 and 3, since an edge surface 120 of a graphite particle 100 is large, lithium ions are easily removed from and inserted into the edge surface 120, and lithium diffusibility on the surface of the graphite particle 100 is improved. In addition, since there are many interfaces 130 between crystallites 110, lithium ions are easily removed and inserted from interfaces 130 between crystallites 110, and the lithium diffusibility inside the graphite particle 100 is improved. In addition, since lithium ions can move across crystallites 110, regarding the laminated structure of the crystal structure of the graphite particle 100, lithium diffusibility in the lamination direction can be improved.

Accordingly, the lithium-ion secondary battery of the present disclosure has improved the charging and discharging performance, particularly the charging and discharging performance at high-rate charging and discharging.

<<Anode Body Layer>>

The anode body layer contains a solid electrolyte and an anode active material. The anode body layer can further contain a binder and/or a conductive assistant.

The anode body layer can have, for example, a structure in which an anode active material layer and an anode current collector layer are laminated with each other in order from the side of the separator layer, and the anode active material and the solid electrolyte can be incorporated into the anode active material layer. The anode active material layer can optionally contain a binder and a conductive assistant in addition to the anode active material and the solid electrolyte.

The material used for the anode current collector layer may be stainless steel (SUS), aluminum, copper, nickel, iron, titanium, or carbon, but the present disclosure is not limited thereto. Among these, the material of the anode current collector layer is preferably copper.

The shape of the anode current collector layer is not particularly limited, and examples thereof include a foil shape, plate shape, and a mesh shape. Among these, a foil shape is preferable.

<Anode Active Material>

The anode active material is graphite particles having a ratio of the crystallite size of the (004) plane to the crystallite size of the (110) plane (crystallite size of the (004) plane/crystallite size of the (110) plane) measured by X-ray crystal diffraction measurement using CuKα rays of 0.683 or more.

The graphite particles can be spherical particles or scaly particles.

X-ray crystal diffraction measurement using CuKα rays may be performed, for example, using a fully automated multi-purpose horizontal X-ray diffractometer SmartLab (9 kw), and using a focusing optical system and D/teXUltra, with a bulb of Cu-Kα, at an output of 45 kV-200 mA, a scan mode of continuous, a sampling interval of 0.01°, a scanning speed of 1°/min, and a scan angle of 10° to 90°.

The crystallite sizes of the (004) plane and the (110) plane can be calculated from the half width of the peak indicating the (004) plane or the (110) plane in the X-ray diffraction spectrum obtained by X-ray crystal diffraction measurement.

More specifically, the crystallite size D can be calculated by the following calculation formula with the Scherrer constant K, the wavelength λ of X rays, the half width B, and the Bragg angle θ.

$$D=K\lambda/B \text{ Cos } \theta$$

The graphite particles may have a ratio of the crystallite size of the (004) plane to the crystallite size of the (110) plane (crystallite size of the (004) plane/crystallite size of the (110) plane) measured by X-ray crystal diffraction measurement using CuKα rays of 0.683 to 1.000.

The crystallite size of the (004) plane/crystallite size of the (110) plane may be 0.683 or more, 0.685 or more, 0.690 or more, or 0.700 or more, and may be 1.000 or less, or less, 0.800 or less, 0.750 or less, or 0.700 or less.

The graphite particles may have a crystallite size of the (104) plane of 40 Å or less measured by X-ray crystal diffraction measurement using CuKα rays.

The crystallite size of the (104) plane may be 40 Å or less, 35 Å or less, 30 Å or less, or 25 Å or less, and may be 5 Å or more, 10 Å or more, 15 Å or more, or 20 Å or more.

The graphite particles may have a ratio of the integrated intensity of the (004) plane to the integrated intensity of the (110) plane measured by X-ray crystal diffraction measurement using CuKα rays of 4.0 or more.

The ratio of the integrated intensity of the (004) plane to the integrated intensity of the (110) plane may be 4.0 or more, 4.5 or more, 5.0 or more, or 5.5 or more, and may be 8.0 or less, 7.5 or less, 7.0 or less, or 6.5 or less.

Graphite particles as the anode active material of the present disclosure can be produced by, for example, the following method.

The raw ore is ground and the graphite is recovered and classified by a flotation method. Then, a halogen gas is sprayed to the graphite to perform a high-purification treatment, and thereby natural flake graphite is obtained. Next, natural spherical graphite is obtained by dispersing natural flake graphite in a high speed airflow and spheroidizing it by applying a shearing force while volume grinding and surface grinding. Here, when natural flake graphite is used, it is not spheroidized.

For the obtained natural flake graphite or natural spherical graphite, the crystallite sizes of the (004) plane and the (110) plane and optionally the integrated intensity thereof are obtained by X-ray crystal diffraction measurement using CuKα rays.

A predetermined value of the crystallite size of the (004) plane/crystallite size of the (110) plane is used for the anode active material of the present disclosure.

Here, desired crystallite sizes and integrated intensities of the (004) plane and the (110) plane can be obtained by appropriately changing volume grinding and surface grinding conditions in the grinding and spheroidization of raw ore.

<Solid Electrolyte>

The solid electrolyte is preferably an inorganic solid electrolyte. Examples of inorganic solid electrolytes include sulfide solid electrolytes, oxide solid electrolytes, and nitride solid electrolytes.

Examples of sulfide solid electrolytes include sulfide-based amorphous solid electrolytes, sulfide-based crystalline solid electrolytes, and argyrodite-type solid electrolytes, but the present disclosure is not limited thereto. Specific examples of sulfide solid electrolytes include $Li_2S—P_2S_5$ types ($Li_7P_3S_{11}$, $Li_3PS_4$, $Li_8P_2S_9$, etc.), $Li_2S—SiS_2$, $LiI—Li_2S—SiS_2$, $LiI—Li_2S—P_2S_5$, $LiI—LiBr—Li_2S—P_2S_5$, $Li_2S—P_2S_5—GeS_2$ ($LinGeP_3S_{16}$, $Li_{10}GeP_2S_{12}$, etc.), $LiI—Li_2S—P_2O_5$, $LiI—Li_3PO_4—P_2S_5$, $Li_{7-x}PS_{6-x}Cl_x$, etc.; and combinations thereof, but the present disclosure is not limited thereto.

Examples of oxide solid electrolytes include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$, and $Li_{3+x}PO_{4-x}N_x$(LiPON), but the present disclosure is not limited thereto.

The solid electrolyte may be glass, glass ceramics or a crystal material. Glass can be obtained by performing amorphous processing on a raw material composition (for example, a mixture of $Li_2S$ and $P_2S_5$). Examples of amorphous processing include mechanical milling. The mechanical milling may be dry mechanical milling or wet mechanical milling, and the latter is preferable. This is because the raw material composition can be prevented from adhering to the wall surface of the container or the like. In addition, the glass ceramics can be obtained by heating glass. In addition, the crystal material can be obtained, for example, by performing a solid phase reaction treatment on a raw material composition.

The shape of the solid electrolyte is preferably a particle shape. In addition, the average particle size (D50) of the solid electrolyte is, for example, 0.01 pin or more. On the other hand, the average particle size (D50) of the solid electrolyte is, for example, 10 pin or less, and may be 5 μm or less. The lithium ion conductivity of the solid electrolyte at 25° C. is, for example, $1\times10^{-4}$ S/cm or more, and preferably $1\times10^{-3}$ S/cm or more.

<Binder>

The binder may be, for example, a material such as polyvinylidene fluoride (PVdF), carboxymethyl cellulose (CMC), butadiene rubber (BR) or styrene butadiene rubber (SBR) or a combination thereof, but the present disclosure is not limited thereto.

<Conductive Assistant>

As the conductive material, a known material can be used, and examples thereof include carbon materials and metal particles. Examples of carbon materials include at least one selected from the group consisting of carbon black such as acetylene black and furnace black, vapor grown carbon fibers (VGCF), carbon nanotubes, and carbon nanofibers, and among these, in consideration of electron conductivity, at least one selected from the group consisting of VGCFs, carbon nanotubes, and carbon nanofibers may be used. Examples of metal particles include nickel, copper, iron, and stainless steel particles.

<<Separator Layer>>

The separator layer may be, for example, a solid electrolyte layer.

The solid electrolyte layer can contain the solid electrolyte and optionally a binder and the like.

<<Cathode Body Layer>>

The cathode body layer can have a structure in which a cathode active material layer and a cathode current collector layer are laminated with each other in order from the side of the separator layer.

The cathode active material layer can contain a cathode active material and optionally a solid electrolyte, a binder, and a conductive assistant.

The cathode active material is, for example, lithium cobaltate ($LiCoO_2$), lithium nickelate ($LiNiO_2$), lithium manganite ($LiMn_2O_4$), or a heteroelement-substituted Li—Mn spinel having a composition represented by $LiCo_{1/3}Ni_{1/3}Mn_{1/3}O_2$, $Li_{1+x}Mn_{2-x-y}M_yO_4$ (M is at least one metal element selected from among Al, Mg, Co, Fe, Ni, and Zn), but the present disclosure is not limited thereto.

In addition, such a cathode active material may be, for example, a sulfur-based active material. Here, the sulfur-based active material is an active material containing at least elemental S. The sulfur-based active material may or may not contain elemental Li. Examples of sulfur-based active materials include elemental sulfur, lithium sulfide ($Li_2S$), and lithium polysulfide ($Li_2S_x$, $2 \le x \le 8$).

The material used for the cathode current collector layer may be stainless steel (SUS), aluminum, copper, nickel, iron, titanium, or carbon, but the present disclosure is not limited thereto. Among these, the material of the cathode current collector layer is preferably aluminum.

The shape of the cathode current collector layer is not particularly limited, and examples thereof include a foil shape, plate shape, and a mesh shape. Among these, a foil shape is preferable.

For the binder and the conductive assistant, those exemplified for the anode body layer may be used.

Examples 1 to 4 and Comparative Examples 1 to 3

<Production of all-Solid-State Secondary Battery and all-Solid-State Symmetric Cell>

Using graphite particles having the shape and the crystallite size of the (004) plane/crystallite size of the (110) plane ($L_{004}/L_{110}$) measured by X-ray crystal diffraction measurement using CuKα rays in the following Table 1, all-solid-state secondary batteries were prepared using graphite particles of Example 1 and Comparative Example 1, and all-solid-state symmetric cells were prepared using graphite particles of Examples 2 to 4 and Comparative Examples 2 and 3.

TABLE 1

| Example | Shape | $L_{004}/L_{110}$ |
|---|---|---|
| Example 1 | Natural spherical shape | 0.693 |
| Example 2 | Natural spherical shape | 0.695 |
| Example 3 | Natural spherical shape | 0.691 |
| Example 4 | Natural spherical shape | 0.683 |
| Comparative Example 1 | Natural spherical shape | 0.641 |
| Comparative Example 2 | Natural spherical shape | 0.596 |
| Comparative Example 3 | Natural spherical shape | 0.593 |

All-solid-state secondary batteries and all-solid-state symmetric cells of respective examples were prepared using a nickel manganese cobalt oxide as a cathode active material, graphite particles shown in Table 1 as an anode active material, and a sulfide solid electrolyte as a solid electrolyte.

[Procedure of Preparing all-Solid-State Secondary Battery]

Specifically, as the cathode active material contained in the cathode active material layer, $Li(NiCoMn)O_2$ having an element molar ratio of Ni:Co:Mn=5:2:3 (hereinafter referred to as NCM523) was used. An argyrodite-type sulfide solid electrolyte was used as the solid electrolyte contained in the cathode active material layer. VGCF (registered trademark) was used as the conductive assistant. A rubber-based binder was used as the binder contained in the cathode active material layer. NCM523, the sulfide solid electrolyte, the binder, and the conductive assistant were mixed in an organic solvent at a predetermined mixing ratio and subjected to a dispersion treatment to prepare a cathode slurry. The obtained cathode slurry was applied onto a stainless steel foil as a cathode current collector and subjected to a vacuum drying treatment, and an organic solvent was evaporated to prepare a cathode. The weight of the cathode active material layer was 15.4 mg per 1 $cm^2$.

As the solid electrolyte contained in the solid electrolyte layer, the same argyrodite-type sulfide solid electrolyte as that used in the cathode active material layer was used. The weight of the solid electrolyte layer was 100 mg per 1 $cm^2$.

As the graphite particles contained in the anode active material layer, those shown in Table 1 were used, and as the solid electrolyte, the same argyrodite-type sulfide solid electrolyte used in the cathode active material layer and the solid electrolyte layer but having a different average particle size was used. The volume mixing ratio of the graphite particles and the sulfide solid electrolyte to a total volume of the solid powder contained in the anode active material layer was 50%:50%. The weight of the anode active material layer was 12.3 mg per 1 $cm^2$.

In a hollow Macor with an 1 $cm^2$ open hole, 100 mg of the argyrodite-type sulfide solid electrolyte powder was added and pressed at a pressure of 1 $tf/cm^2$ for 1 minute to primarily mold a solid electrolyte layer. Next, under the primarily molded solid electrolyte layer, 12.3 mg of the anode powder mixture having a volume mixing ratio of 50%:50% was added and pressed at a pressure of 1 $tf/cm^2$ for 1 minute to primarily mold a lower anode active material layer. Next, above the solid electrolyte layer, the cathode punched into a circular shape having a cross-sectional area of 1 $cm^2$ was added and pressed at a pressure of 6 $tf/cm^2$ for 1 minute to perform main molding. After the main molding was completed, the pressure of 6 $tf/cm^2$ was released once and a restraint jig was used to perform restraining at a pressure of 1.53 $tf/cm^2$. Here, when the theoretical capacity of graphite was 372 mAh/g, and the specific capacity of the cathode using NCM523 was 162 mAh/g, the ratio of the capacity of the anode active material layer to the capacity of the cathode active material layer (capacity of the anode active material layer/capacity of the cathode active material layer) was 1.51.

[Procedure of Preparing all-Solid-State Symmetric Cell]

An all-solid-state symmetric cell was a cell in which an anode active material layer, a solid electrolyte layer, and an anode active material layer were laminated in this order from bottom to top. When the material configurations, weights, and thicknesses (filling rates) of the bottom anode active material layer and the top anode active material layer were set to be as close as possible, the ion transport resistance (SI) could be accurately measured by the AC impedance method.

Specifically, as the solid electrolyte contained in the solid electrolyte layer of the intermediate layer, the same argyrodite-type sulfide solid electrolyte as used in the cathode active material layer and the solid electrolyte layer of the all-solid-state secondary battery was used. The weight of the solid electrolyte layer was 100 mg per 1 $cm^2$.

As the graphite particles contained in the bottom and top anode active material layers, those shown in Table 1 were used, and as the solid electrolyte, the same argyrodite-type sulfide solid electrolyte used in the anode active material layer of the all-solid-state secondary battery was used. The volume mixing ratio of the graphite particles and the sulfide solid electrolyte to a total volume of the solid powder contained in the anode active material layer was 50%:50%. The weight of the anode active material layer was 11.4 mg per 1 $cm^2$.

In a hollow Macor with an 1 $cm^2$ open hole, 100 mg of the argyrodite-type sulfide solid electrolyte powder was added and pressed at a pressure of 1 tf/$cm^2$ for 1 minute to primarily mold a solid electrolyte layer. Next, under the primarily molded solid electrolyte layer, 11.4 mg of the anode powder mixture having a volume mixing ratio of 50%:50% was added and pressed at a pressure of 1 tf/$cm^2$ for 1 minute to primarily mold a bottom anode active material layer. Next, above the solid electrolyte layer, 11.4 mg of the anode powder mixture having a volume mixing ratio of 50%:50% was added and pressed at a pressure of 1 tf/$cm^2$ for 1 minute to primarily mold the top anode active material layer. Next, pressing was performed at a pressure of 6 tf/$cm^2$ for 1 minute to perform main molding. After the main molding was completed, the pressure of 6 tf/$cm^2$ was released once and a restraint jig was used to perform restraining at a pressure of 1.53 tf/$cm^2$.

Here, X-ray crystal diffraction measurement using CuKα rays was performed using a fully automated multi-purpose horizontal X-ray diffractometer SmartLab (9 kw) and using a focusing optical system and D/teXUltra, with a bulb of Cu-Kα, at an output of 45 kV-200 mA, a scan mode of continuous, a sampling interval of 0.01°, a scanning speed of 1°/min, and a scan angle of 10° to 90°.

Figure 4:
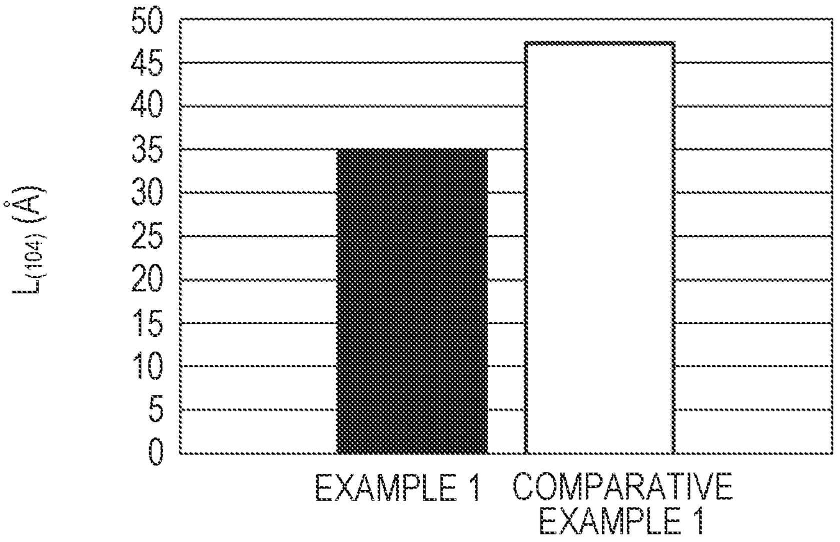
FIG. 4 is a graph showing crystallite sizes of the (104) plane of graphite particles of Example 1 and Comparative Example 1 measured by X-ray crystal diffraction measurement using CuKα rays.
Figure 5:
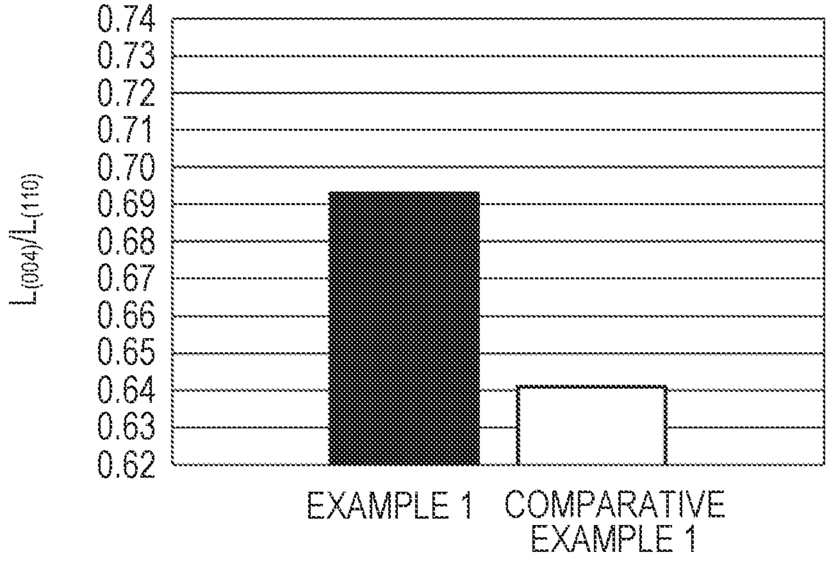
FIG. 5 is a graph showing the ratio of the crystallite size of the (004) plane to the crystallite size of the (110) plane (crystallite size of the (004) plane/crystallite size of the (110) plane) of graphite particles of Example 1 and Comparative Example 1 measured by X-ray crystal diffraction measurement using CuKα rays.
Figure 6:
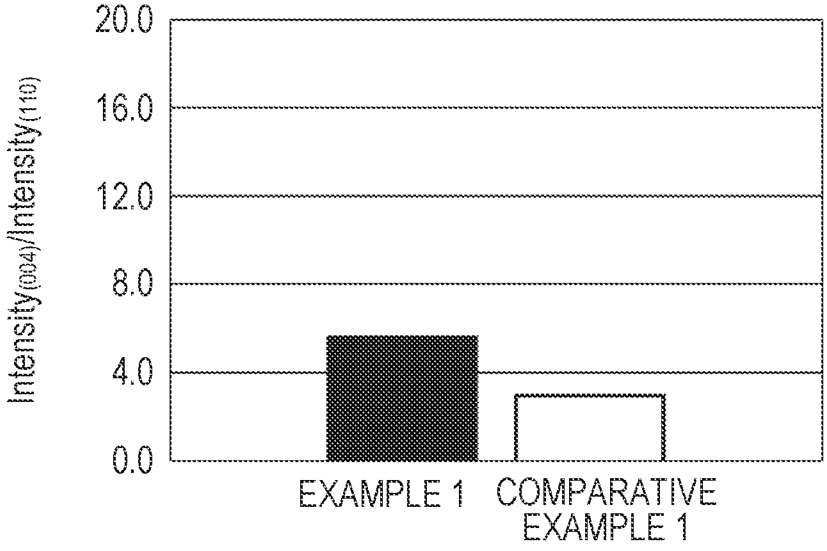
FIG. 6 is a graph showing an integrated intensity of the (004) plane with respect to an integrated intensity of the (110) plane of graphite particles of Example 1 and Comparative Example 1 measured by X-ray crystal diffraction measurement using CuKα rays.

Here, for reference, FIGS. 4 to 6 show the crystallite size of the (004) plane of graphite particles used in Example 1 and Comparative Example 1 measured by X-ray crystal diffraction measurement using CuKα rays, the crystallite size of the (004) plane/crystallite size of the (110) plane, and the ratio of the integrated intensity of the (004) plane to the integrated intensity of the (110) plane.

<Evaluation of Rate Performance>

After the all-solid-state batteries of Example 1 and Comparative Example 1 were left in a thermostatic chamber 25° C. for 8 hours, CC charging was performed at 25° C. and a cutoff voltage of 4.2 V and 0.17 mA, CV charging was performed at a cutoff current of 0.017 mA and 4.2 V, CC discharging was performed at 25° C. and a cutoff voltage of 3.0 V and 0.17 mA, CC discharging was performed at a cutoff current of 0.017 mA, and the initial performance were evaluated. This charging and discharging were repeated a total of three times, the third CC-CV discharging capacity was used as the cell capacity, and the current value when the rate performance were evaluated was determined.

Next, CC charging was performed at 25° C. and a cutoff voltage of 4.2 V between 0.1 C and 2 C in increments of 0.1 C, and CV charging was not performed, CC discharging was performed at 25° C. and a cutoff voltage of 3.0 V with the same current value as in the CC charging, CC discharging was performed at a cutoff current of 0.01 C, and the rate performance were evaluated. The ratio (%) of the charging capacity when CC charging was performed from 0.1 C to 2 C to the charging capacity when CC charging was performed at 0.1 C was calculated.

Figure 7:
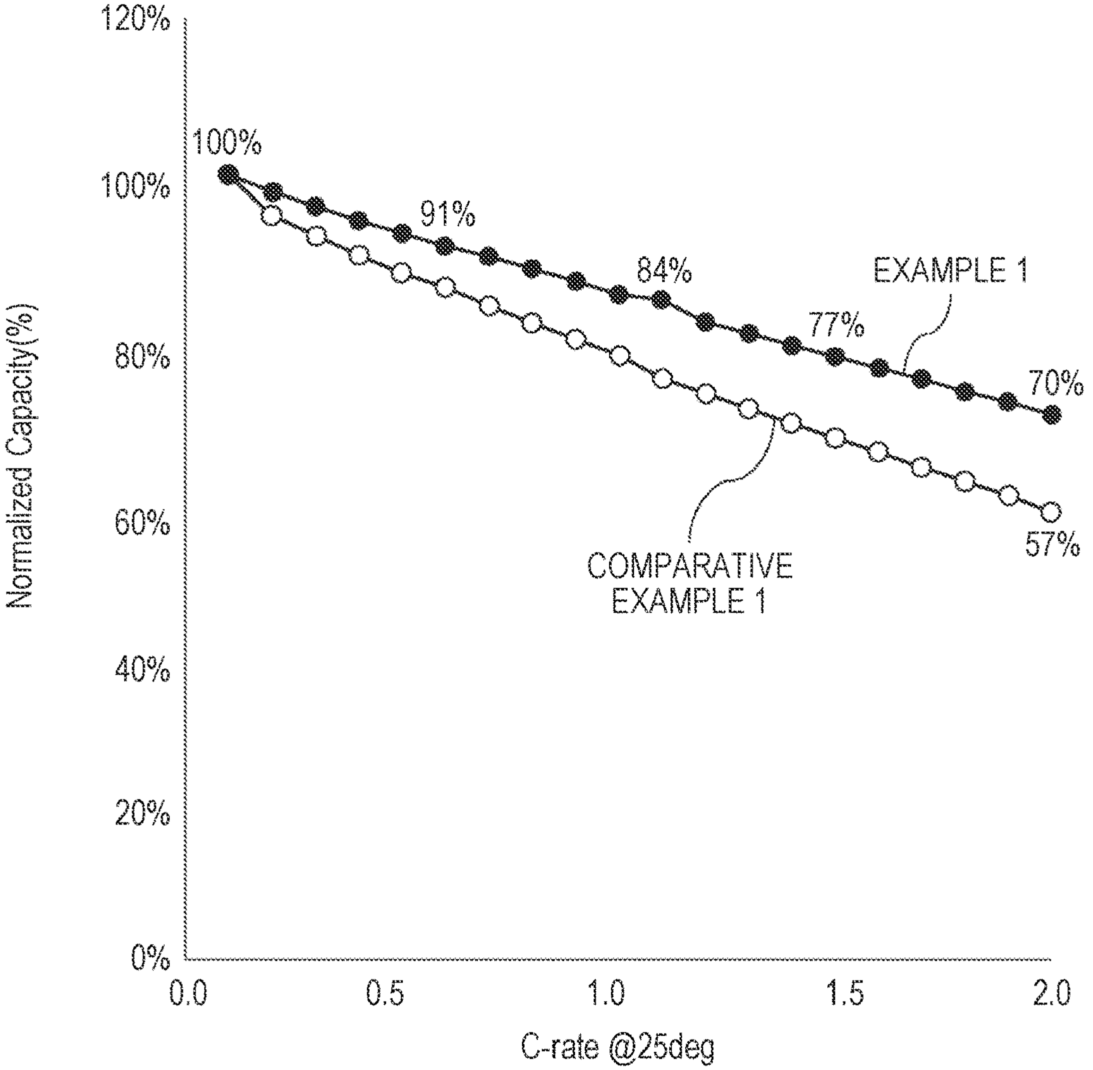
FIG. 7 is a graph showing the charging and discharging rate performance of all-solid-state lithium-ion secondary batteries of Example 1 and Comparative Example 1.

The measurement results are shown in FIG. 7.

As shown in FIG. 7, in the all-solid-state secondary battery of Example 1 in which the crystallite size of the (004) plane/crystallite size of the (110) plane was 0.693, the ratio (%) of the charging capacity to the charging capacity was larger than the ratio (%) of the charging capacity to the charging capacity in the all-solid-state secondary battery of Comparative Example 1 in which the crystallite size of the (004) plane/crystallite size of the (110) plane was 0.641.

<AC Impedance Measurement>

Figure 8:
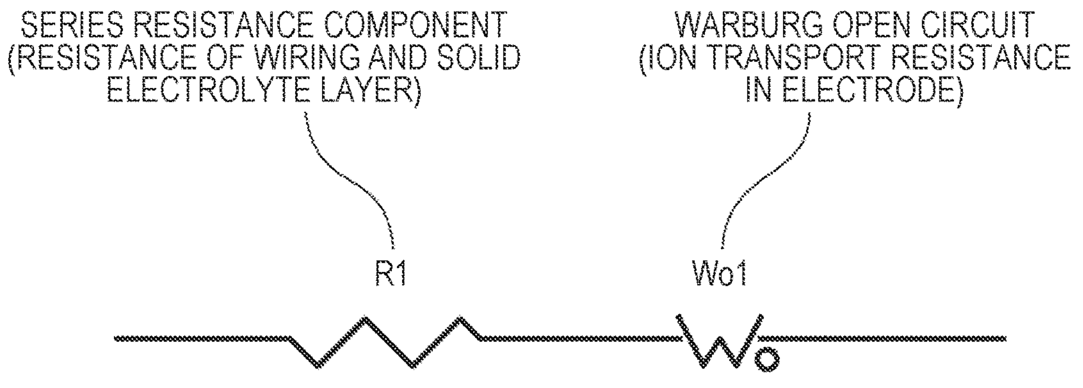
FIG. 8 is an equivalent circuit of a symmetrical cell in AC impedance measurement.

An anode active material layer was formed using the graphite particles used in Examples 2 to 4 and Comparative Examples 2 and 3 as an anode active material and a lithium foil was used on the side of the cathode to prepare an all-solid-state symmetric cell. An AC voltage was applied between the bottom and top anode active material layers of the all-solid-state symmetric cell at a voltage amplitude of 10 mV and in a frequency range from 7 MHz to 100 mHz, and the AC impedance was measured using VMP300 (commercially available from BioLogic). The circuit constant was fitted using the equivalent circuit shown in FIG. 8, and the resistance value Wo-R of the Warburg open circuit was calculated. Since the calculated resistance value Wo-R indicated the ion transport resistance value of two layers: the bottom and top anode active material layers, ½ of the resistance value Wo-R of the Warburg open circuit corresponded to the ion transport resistance (SI) of the single anode active material layer.

The ion transport resistance (SI) of the all-solid-state symmetric cells of respective examples was evaluated by AC impedance measurement (25° C. and 60° C.). The results are shown in Table 2.

TABLE 2

| | | Ion transport resistance (Ω) | |
|---|---|---|---|
| Example | $L_{004}/L_{110}$ | 25° C. | 60° C. |
| Example 2 | 0.695 | 18.2 | 4.4 |
| Example 3 | 0.691 | 15.5 | 3.5 |
| Example 4 | 0.683 | 17.7 | 4.0 |
| Comparative Example 2 | 0.596 | 26.4 | 6.0 |
| Comparative Example 3 | 0.593 | 30.6 | 7.0 |

As shown in Table 2, in Examples 2 to 4 in which the crystallite size of the (004) plane/crystallite size of the (110) plane was 0.695, 0.691, and 0.683, respectively, the ion transport resistance measured by the AC impedance was lower than Comparative Examples 2 and 3 in which the crystallite size of the (004) plane/crystallite size of the (110) plane was 0.596 and 0.593, respectively.

Accordingly, it can be said that, in the all-solid-state symmetric cells of Examples 2 to 4 in which isotropic graphite particles were used as the anode active material, a reduction in electrode resistance was confirmed and the diffusibility of lithium ions in the anode was very good.

What is claimed is:

1. A lithium-ion secondary battery comprising a cathode body layer, a separator layer, and an anode body layer in that order, wherein the anode body layer contains a solid electrolyte and an anode active material, and wherein the anode active material is graphite particles having a ratio of a crystallite size of a (004) plane to a crystallite size of a (110) plane (the crystallite size of the (004) plane/the crystallite size of the (110) plane) measured by X-ray crystal diffraction measurement using CuKα rays of 0.683 or more and 0.695 or less.

2. The lithium-ion secondary battery according to claim 1, wherein the graphite particles are spherical particles or scaly particles.

3. The lithium-ion secondary battery according to claim 1, wherein the graphite particles have a crystallite size of 40 Å or less of a (104) plane measured by X-ray crystal diffraction measurement using CuKα rays.

4. The lithium-ion secondary battery according to claim 1, wherein the graphite particles have a ratio of an integrated intensity of the (004) plane to an integrated intensity of the (110) plane measured by X-ray crystal diffraction measurement using CuKα rays of 4.0 or more.

5. The lithium-ion secondary battery according to claim 3, wherein the graphite particles have a ratio of an integrated intensity of the (004) plane to an integrated intensity of(110) plane measured by X-ray crystal diffraction measurement using CuKα rays of 4.0 or more.

6. The lithium-ion secondary battery according to claim 1, wherein the anode body layer has a structure in which an anode active material layer and an anode current collector layer are laminated with each other in order from a side of the separator layer, and wherein the anode active material and the solid electrolyte are incorporated into the anode active material layer.

7. The lithium-ion secondary battery according to claim 1, wherein the cathode body layer has a structure in which a cathode active material layer and a cathode current collector layer are laminated with each other in order from a side of the separator layer.

8. The lithium-ion secondary battery according to claim 1, wherein the separator layer is a solid electrolyte layer.

9. The lithium-ion secondary battery according to claim 1, wherein the solid electrolyte is a sulfide solid electrolyte.

* * * * *